United States Patent [19]

Anderson

[11] 4,257,677
[45] Mar. 24, 1981

[54] RETROVIEWER

[75] Inventor: John P. Anderson, Ontario, Calif.

[73] Assignee: Hartwell Corporation, Placentia, Calif.

[21] Appl. No.: 89,533

[22] Filed: Oct. 29, 1979

[51] Int. Cl.³ .............................................. G02B 27/14
[52] U.S. Cl. ................................... 350/174; 350/299
[58] Field of Search ............... 350/71, 174, 105, 236, 350/235, 173, 29, 301, 299; 356/71

[56] References Cited

U.S. PATENT DOCUMENTS

| | | | |
|---|---|---|---|
| 3,767,291 | 10/1973 | Johnson | 350/237 |
| 3,767,305 | 10/1973 | Craven | 356/71 |
| 3,832,038 | 8/1974 | Johnson | 350/236 |
| 3,944,336 | 3/1976 | Carr | 350/174 |
| 4,131,337 | 12/1978 | Moraw et al. | 356/71 |

Primary Examiner—John K. Corbin
Assistant Examiner—B. Wm. de los Reyes
Attorney, Agent, or Firm—Lyon & Lyon

[57] ABSTRACT

A retroviewer for viewing documents, labels or other articles having a retro-reflective legend bearing layer of microscopic beads overlying a portion or all of the information on the article. The layer appears transparent under normal diffused lighting conditions but when illuminated by substantially collimated light, the information is obscured leaving the legend prominently displayed. Altered or counterfeit articles are thus easily detectable. The retroviewer is designed to accommodate articles of various shapes and sizes and to permit the observer to view an article from a comfortably seated position, with adjustments possible for observers of various heights.

12 Claims, 2 Drawing Figures

RETROVIEWER

BACKGROUND OF THE INVENTION

The present invention relates to a viewing device for use in verifying the authenticity of documents and other articles which are coated by a retro-reflective legend bearing layer.

A substantially transparent film material has recently become available which has both retro-reflective legend areas and retro-reflective background areas of differing reflectances. The film is substantially transparent under ordinary diffused lighting conditions, so that the legend and background areas are essentially indistinguishable, but when viewed under substantially collimated light, the legend areas and background areas are clearly distinguishable. Thus, if alterations have been made or attempted in the document or other article to which the film is attached, or if the document is not genuine, these facts will appear as irregularities or disturbances in the legend when the film is viewed under retro-reflective viewing conditions. A complete description of such a film material and its manner of use is found in Sevelin et al, U.S. Pat. No. 3,801,183, the specification and drawings of which are hereby incorporated by reference herein.

Viewing devices are known which are designed for use with such a legend bearing retro-reflective film, such as those described in Craven, U.S. Pat. No. 3,767,305 and Johnson, U.S. Pat. No. 3,767,291. A hand retroviewer is described in Johnson, U.S. Pat. No. 3,832,038. The hand retroviewer, however, is obviously limited in application and the retroviewers described in the other above mentioned patents are severely limited as to the size and shape of the film-covered document or article which can be accommodated for viewing and as to the angle of viewing. Thus, niether retroviewer can accommodate oversized or oddly shaped articles. Also, the Johnson viewer requires that the observer be standing up or sitting in an awkward position and looking almost straight down to perceive the image. Additionally, the Craven viewer requires adjustments depending upon whether the observer is standing or sitting, and the position of the viewing apparatus cannot be changed independently of the shelf holding the article to be viewed. Further, both the Johnson and Craven viewers require precise positioning of the eye or other receptor to perceive the best image.

SUMMARY OF THE INVENTION

According to the present invention, there is provided a retroviewer for use in viewing documents or other articles coated by a retro-reflective film layer which permits an observer to be seated while operating the device and which will accommodate articles of various shapes and sizes for viewing. The retroviewer may be adjustable to present the retro-reflected image at the most comfortable position for the observer, and the position of the article being viewed need not be affected by such adjustment. Furthermore, the placement of the eye or other receptor is not as critical as in prior such devices.

Accordingly, it is an object of the present invention to provide an improved retroviewer for viewing articles having a legend bearing retro-reflective layer affixed thereto.

It is a further object of the present invention to provide such a retroviewer which will accommodate articles of various shapes and sizes for viewing.

It is another object of the present invention to provide such a retroviewer which will permit the operator to be seated in a comfortable position for viewing the retro-reflected image.

These and other objects and advantages of the present invention will become apparent from the following detailed description taken in conjunction with the accompanying drawings.

DETAILED DESCRIPTION OF THE INVENTION

Figure 1:
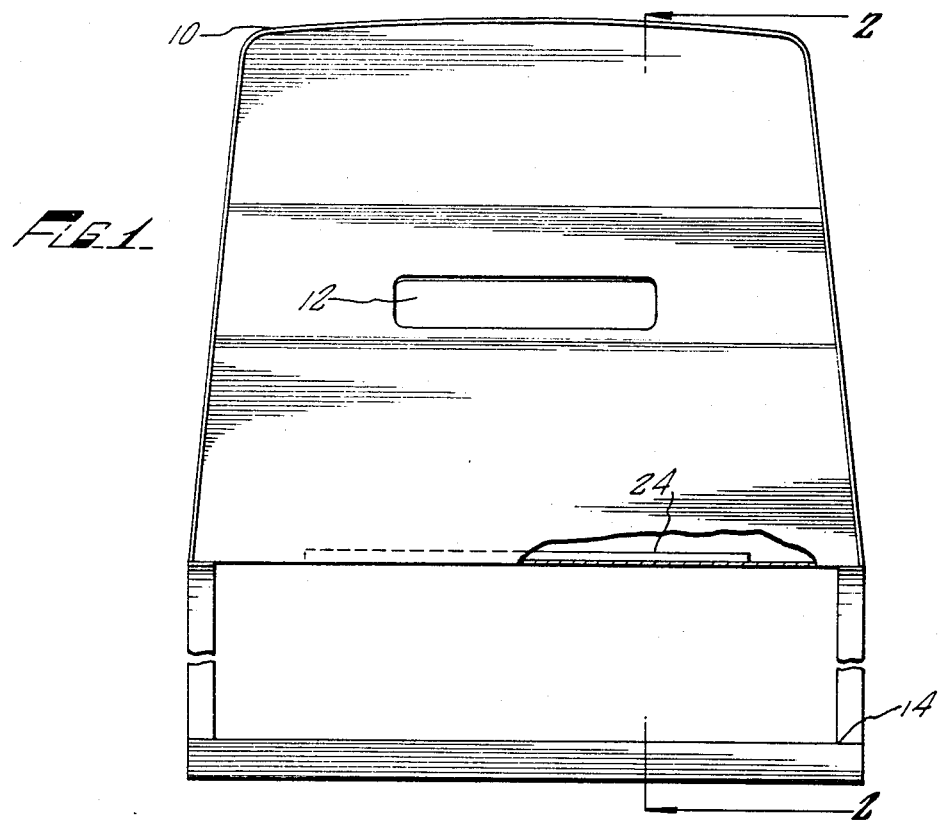
FIG. 1 is a front view of a retroviewer according to the present invention.

Referring first to FIG. 1, there is illustrated a housing 10 having a viewing window 12 formed therein and supported upon a base 14 which may incorporate a viewing stage to be described hereinafter. A portion of the front part of the housing 10 is broken away to reveal a plane mirror 24 therein, whose purpose will be described in greater detail hereinafter.

Figure 2:
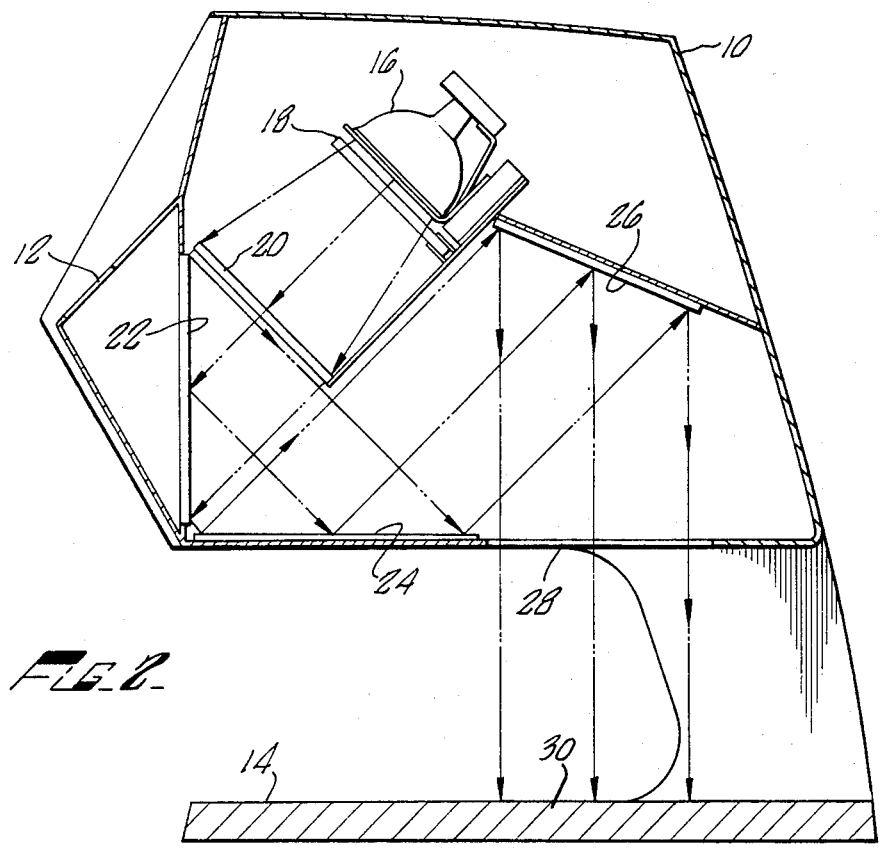
FIG. 2 is a side cross-sectional elevation of the retroviewer of FIG. 1, taken along the line 2—2 of FIG. 1, and showing the internal components thereof.

FIG. 2 illustrates the internal construction of the retroviewer of FIG. 1. Within the housing 10 there is mounted a lamp 16 for providing illumination. The lamp is preferably of the type such as a General Electric ESX 25 Watt Quartzline Lamp, which provides a wide, substantially collimated light beam of considerable intensity. A diffuser 18 is preferably mounted in front of the lamp 16 to achieve more even illumination. A lens 20 is preferably positioned in the beam from the lamp 16 to further improve the collimation of the light beam. For compactness and light weight, the lens is preferably a Fresnel lens or the like.

A beamsplitter 22 is mounted in front of the lens 20 at approximately a 45° angle to the path of the light beam. The beamsplitter 22 is a partially reflecting plane mirror through which a portion of the light incident thereon may be transmitted as well. The light which is reflected therefrom is directed to a first plane mirror 24 which is preferably positioned at approximately a 90° angle to the beamsplitter 22. A second plane mirror 26 is positioned at an angle to the first plane mirror 24 such that light incident thereon after reflection from the first plane mirror 24 is reflected therefrom through an aperture 28 in the housing 10 to a viewing stage 30. The angular orientation of the viewing stage 30 may be adjustable with respect to the other elements of the device, but the angular orientation of the second plane mirror 26 should always be chosen such that the light reflected therefrom toward the viewing stage 30 is directed at substantially a 90° angle to the retro-reflected legend bearing layer affixed to an article which is to be viewed. In such a configuration, therefore, it will be seen that the light reflected from the second plane mirror 26 onto an article having a legend bearing retro-reflecting layer affixed thereto and positioned on the viewing stage 30 is reflected back to the second plane mirror 26, and therefrom to the first plane mirror 24. The light is then reflected from the first plane mirror 24 back to the beamsplitter 22, and a portion of the light passes through the beamsplitter 22 and may be perceived by an observer viewing the beamsplitter 22 through the window 12. In accordance with the above described principles, the illumination incident on the retro-flective layer will cause the legend portion and the background portion thereof to be clearly distinguishable, so that any alterations or defects in the legend will be quickly apparent. Thus, an altered or counterfeit document or other article is easily detectable.

The preferred embodiment of a retroviewer according to the present invention, as shown in the drawings, comprises a horizontal viewing stage 30 which is open and accessible on at least three sides, so that documents or other articles positioned thereon may be easily viewed without having to be inserted into a restrictive insertion slot or holder for viewing. Thus, large stacks of document can be easily passed through the retroviewer for authentication with a minimum of effort. Also, the housing 10 is preferably supported well above the viewing stage 30, so that the retroviewer is not limited merely to viewing thin, flat articles such as documents.

In order to provide the retro-reflected image to a seated observer at an ordinarily comfortable viewing height, the first plane mirror 24 is preferably positioned parallel to the base 14, with the beamsplitter 22 preferably at right angles thereto. Thus, the second plane mirror 26 is positioned at an angle of 22.5° to the plane of the first plane mirror 24. To accommodate viewers of various heights, however, the position of the viewing window 12 and the lamp 16, the lens 20 and the beamsplitter 22 may be varied such as by rotation thereof about an axis located at the lower end of the beam splitter 22, with corresponding changes in the angular orientations of the first plane mirror 24 and the second plane mirror 26 to compensate therefor and to provide the desired perpendicular illumination to the article under examination. Also, as previously mentioned the viewing stage 30 may be oriented at an angle to the base 14, with corresponding adjustment of the angle of the second plane mirror 26. The foregoing suggested variations are, of course, merely exemplary and not limitative or exhaustive.

Thus, it will be seen that there is provided by the present invention a retroviewer having much greater flexibility in design and operation than previous retroviewers. Although a preferred embodiment of the present invention has been illustrated and described herein, many other variations and modifications thereof will be apparent to those skilled in the art, and it is intended that all such variations and modifications be encompassed within the scope of the appended claims.

I claim:

1. Apparatus for viewing an article having a retro-reflective legend bearing layer affixed thereto, comprising
   a light source capable of producing a substantially collimated light beam,
   a beamsplitter inclined at an angle to said light beam and positioned so that said light beam impinges thereon and is partially reflected thereby,
   a first plane mirror inclined at an angle to said beamsplitter and positioned to receive said partially reflected light beam from said beamsplitter, and
   a second plane mirror inclined at an angle to said first plane mirror and positioned to receive said light beam upon reflection thereof from said first plane mirror and to reflect said light beam onto an article to be viewed, so that said light beam upon retroreflection by the retro-reflective layer of such an article is reflected via said second plane mirror and said first plane mirror back to said beamsplitter and is partially transmitted thereby for reception by an observer.

2. Apparatus as in claim 1 wherein said light source includes a collimating lens.

3. Apparatus as in claim 1 wherein the angular orientation of said beamsplitter is adjustable to vary the angle of presentation of said reflected light beam which is partially transmitted thereby for reception by an observer.

4. Apparatus as in claim 3 wherein the angular orientations of said first and second plane mirrors are adjustable responsive to adjustments in the angular orientation of said beamsplitter.

5. Apparatus as in claim 1 wherein the angular orientations of said first and second plane mirrors are adjustable.

6. Apparatus as in claim 1 wherein said light source, said beamsplitter and said first and second plane mirrors are housed within a housing, said housing having an aperture positioned to permit said light beam reflected by said second plane mirror to impinge upon an article to be viewed and a window positioned to permit said reflected light beam which is partially transmitted by said beamsplitter to be received by an observer.

7. Apparatus as in claim 1 wherein said beamsplitter is inclined at an angle of approximately 45° to said light beam.

8. Apparatus as in claim 7 wherein said first plane mirror is inclined at an angle of approximately 90° to said beamsplitter.

9. Apparatus as in claim 8 wherein said second plane mirror is inclined at such an angle to said first plane mirror as to direct said light beam substantially perpendicularly to the retro-reflective layer of an article to be viewed.

10. Apparatus for viewing an article having a retro-reflective legend bearing layer affixed thereto, comprising
    a light source capable of producing a substantially collimated light beam,
    a beam splitter inclined at an angle to said light beam and positioned so that said light beam impinges thereon and is partially reflected thereby,
    a first plane mirror inclined at an angle to said beamsplitter and positioned to receive said partially reflected light beam from said beamsplitter,
    a second plane mirror inclined at an angle to said first plane mirror and positioned to receive said light beam upon reflection thereof from said first plane mirror and to reflect said light beam,
    a housing within which said light source, said beamsplitter, and said first and said second plane mirrors are housed, said housing having an aperture and a window, and
    a viewing stage in spaced relationship with respect to said aperture, said viewing stage being adapted to receive said article, said aperture being positioned to permit said light beam reflected by said second plane mirror to impinge upon said article received by said viewing stage, so that said light beam upon retro-reflection by the retro-reflective layer of said article is reflected via said second plane mirror and said first plane mirror to said beamsplitter and is partially transmitted thereby, said opening being positioned to permit said partially transmitted light beam to be received by an observer.

11. Apparatus as in claim 10 wherein said viewing stage is open on at least three sides.

12. Apparatus as in claim 10 wherein said viewing stage is disposed substantially perpendicular to said light beam reflected from said second plane mirror.

* * * * *